US008638344B2

(12) United States Patent
Jaramillo et al.

(10) Patent No.: US 8,638,344 B2
(45) Date of Patent: *Jan. 28, 2014

(54) AUTOMATICALLY MODIFYING PRESENTATION OF MOBILE-DEVICE CONTENT

(75) Inventors: David Jaramillo, Lake Worth, FL (US); Robert E. Loredo, North Miami Beach, FL (US); Jonathan Palgon, Boynton Beach, FL (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/416,708

(22) Filed: Mar. 9, 2012

(65) Prior Publication Data

US 2013/0235058 A1    Sep. 12, 2013

(51) Int. Cl.
*G09G 5/00*      (2006.01)

(52) U.S. Cl.
USPC .......................................................... 345/619

(58) Field of Classification Search
None
See application file for complete search history.

(56) References Cited

U.S. PATENT DOCUMENTS

| | | | |
|---|---|---|---|
| 6,195,640 B1* | 2/2001 | Mullaly et al. ............... | 704/260 |
| 8,401,248 B1* | 3/2013 | Moon et al. .................. | 382/118 |
| 2004/0119714 A1 | 6/2004 | Everett et al. | |
| 2005/0030322 A1 | 2/2005 | Gardos | |
| 2005/0229200 A1 | 10/2005 | Kirkland et al. | |
| 2008/0001951 A1* | 1/2008 | Marks et al. ................. | 345/474 |
| 2008/0297589 A1* | 12/2008 | Kurtz et al. ................. | 348/14.16 |
| 2009/0079765 A1 | 3/2009 | Hoover | |
| 2009/0164896 A1 | 6/2009 | Thorn | |
| 2010/0103197 A1 | 4/2010 | Liu | |
| 2010/0188426 A1 | 7/2010 | Ohmori et al. | |
| 2010/0321519 A1* | 12/2010 | Bill ............................ | 348/222.1 |
| 2011/0084897 A1 | 4/2011 | Manoharan et al. | |
| 2011/0126119 A1 | 5/2011 | Young et al. | |
| 2011/0148930 A1 | 6/2011 | Lee et al. | |

(Continued)

FOREIGN PATENT DOCUMENTS

| | | |
|---|---|---|
| CN | 1937813 | 3/2007 |
| CN | 102045429 | 5/2011 |
| WO | 2011150889 | 12/2011 |

OTHER PUBLICATIONS

U.S. Appl. No. 13/443,341, filed Apr. 10, 2012, Jaramillo, David et al.

(Continued)

*Primary Examiner* — Aaron M Richer
*Assistant Examiner* — Mohammad H Akhavannik
(74) *Attorney, Agent, or Firm* — DeLizio Gilliam, PLLC (57) ABSTRACT

Some embodiments of the inventive subject matter are directed to determining a first setting(s) for presentation of content on a display of a mobile device at a distance from a user. The first setting(s) are based on analysis of characteristics associated with the mobile device. The characteristics are related to a user, an environment external to the mobile device, and content presented via the mobile device. Some embodiments are further directed to detecting a change in one or more of the characteristics in response to presentation of the content on the mobile device. The change is an event that indicates that the first setting(s) are non-optimal for presentation of the content at the distance. Some embodiments are further directed to determining second settings for presentation of content at the distance from the user based on the change in the one or more characteristics.

17 Claims, 5 Drawing Sheets

(56) References Cited

U.S. PATENT DOCUMENTS

| | | | | |
|---|---|---|---|---|
| 2011/0279359 A1* | 11/2011 | McCarty | | 345/156 |
| 2012/0075166 A1* | 3/2012 | Marti et al. | | 345/1.1 |
| 2012/0076368 A1* | 3/2012 | Staudacher et al. | | 382/118 |
| 2012/0256833 A1* | 10/2012 | Chiang | | 345/157 |
| 2012/0257035 A1* | 10/2012 | Larsen | | 348/78 |
| 2013/0005443 A1 | 1/2013 | Kosta et al. | | |
| 2013/0057553 A1* | 3/2013 | Chakravarthula et al. | | 345/468 |

OTHER PUBLICATIONS

"PCT Application No. PCT/CN2013/070811 International Search Report", Apr. 25, 2013, 12 pages.

"U.S. Appl. No. 13/443,341 Office Action", Apr. 24, 2013, 17 pages.

* cited by examiner

AUTOMATICALLY MODIFYING PRESENTATION OF MOBILE-DEVICE CONTENT

BACKGROUND

Embodiments of the inventive subject matter generally relate to the field of mobile devices, and, more particularly, to modifying presentation of content via a mobile device.

Mobile devices, such as mobile phones, are designed to be small. Their small size has certain advantages. For example, they can be moved easily, stored in a user's pocket or purse, etc. However, their small size can also have disadvantages. For example, content presented on a display of a mobile device is harder to see than on larger displays such as televisions, computer monitors, etc. Small fonts on a small display can be especially difficult to see when a user moves the device around.

SUMMARY

Some embodiments are directed to determining one or more first settings for presentation of content on a display of a mobile device at a distance from a user, wherein the one or more first settings are based on analysis of one or more of user characteristics, environmental characteristics, and content characteristics associated with the mobile device. Some embodiments are further directed to determining that the mobile device is the distance from the user, presenting content on the mobile device using the one or more first settings for presentation of the content, and detecting a change in the one or more of user characteristics, environmental characteristics, and content characteristics in response to presentation of the content on the mobile device. Some embodiments are further directed to determining one or more second settings for presentation of content on the display of the mobile device at the distance from the user based on the change in the one or more of user characteristics, environmental characteristics, and content characteristics. Further, some embodiments are directed to presenting the content via the display of the mobile device in accordance with the one or more second settings.

Some embodiments are directed to determining one or more first font characteristics for presentation of content on a display of a mobile device at a distance from a user, wherein the one or more first font characteristics are based on first digital analysis of one or more recorded images of one or more facial characteristics of the user. Some embodiments are further directed to determining that the mobile device is the distance from the user, presenting content on the mobile device using a font having the one or more first font characteristics, and detecting a change in appearance of the one or more facial characteristics of the user based on second digital analysis of one or more second recorded images of the facial characteristics of the user. Some embodiments are further directed to determining one or more second font characteristics for presentation of the font on the display of the mobile device at the distance from the user based on the second digital analysis of the one or more second recorded images of the one or more facial characteristics of the user. Further, some embodiments are directed to modifying presentation of the content in accordance with the one or more second font characteristics.

DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes example systems, methods, techniques, instruction sequences, and computer program products that embody techniques of the present inventive subject matter. However, it is understood that the described embodiments may be practiced without these specific details. For instance, although examples refer to determining optimal characteristics for textual content, other instances may include determining optimal characteristics for sound content, video content, and so forth. In other instances, well-known instruction instances, protocols, structures, and techniques have not been shown in detail in order not to obfuscate the description.

As stated previously, the size and portability of mobile devices can present certain challenges regarding presentation of content. The mobile device moves with the user. The environmental conditions surrounding the user, and hence the mobile device, change periodically as the user moves from room to room, inside to outside, etc. Further, user's perform activities while using their mobile devices. The movement of the mobile device and activities of a user can distract the user from the content.

Embodiments of the inventive subject matter use components of a mobile device to detect characteristics of the user, characteristics of the environment external to the mobile device, characteristics of the content, etc. and dynamically adjust presentation of content via the mobile device based on the detected characteristics. For instance, some embodiments include capturing images of a user using a camera of the mobile device, digitally processing the images to detect a change in distance or orientation of the mobile device relative to a user, and modifying presentation of text font size on a display of the mobile device based on the change in distance and/or orientation.

Figure 1A:
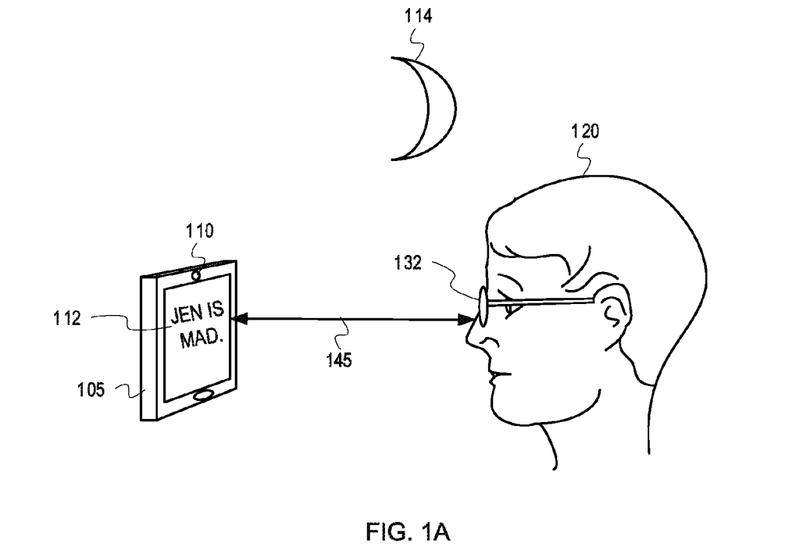
FIGS. 1A-1B are example conceptual diagrams of dynamically modifying mobile-device content.
Figure 1B:
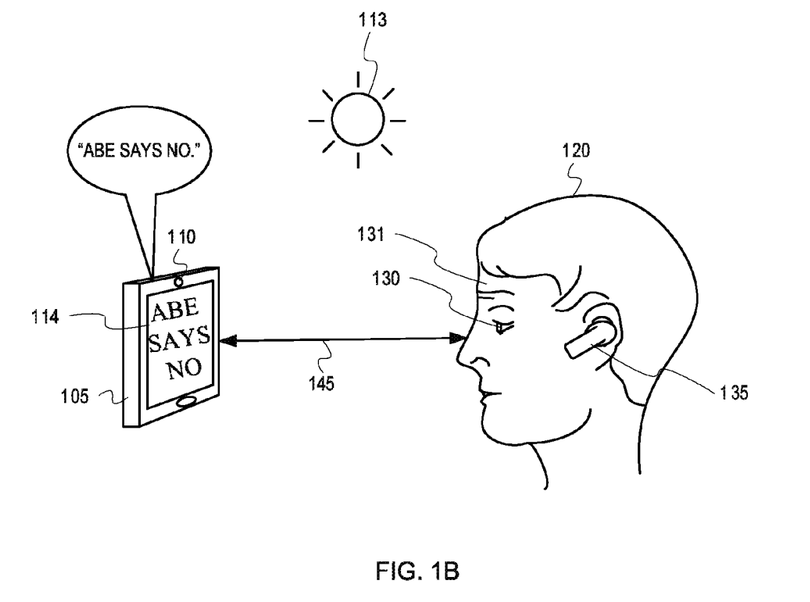

FIGS. 1A-1B are example conceptual diagrams of dynamically modifying mobile-device content. In FIG. 1, a dynamic-content modification system ("system") includes one or more mobile devices, such as the mobile device 105 (e.g., a cell phone, a smart phone, a tablet device, a personal digital assistant, etc.). The mobile device 105 has wireless communications capabilities to communicate via a communications network, such as a telephone network, a Wi-Fi network, the Internet, and so forth. The mobile device 105 presents various applications that can communicate with servers accessible via the communications network.

The mobile device 105 detects characteristics of a user 120, characteristics of an environment external to the mobile device 105, characteristics of content presented via the mobile device 105, etc, and dynamically adjusts presentation of content via the mobile device 105 based on the detected characteristics. The mobile device 105 may include, for example, a camera 110, a gyroscope, a distance sensor, a light sensor, a sound sensor, and so forth. The mobile device 105, for instance, uses the camera 110 to capture images of the user 120 to determine user characteristics, such as unique features of the user's face to identify the user 120. The mobile device 105 digitally processes the images to determine the identity of the user 120. The mobile device 105 further detects characteristics of the environment, such as a degree of light from a light source 114. The degree of light can affect an amount of potential glare on a display of the mobile device 105. The mobile device 105 presents content on the display of the mobile device 105, such as text 112, with first font characteristics. The mobile device 105 detects a distance 145 of the user 120 via digital analysis of the images of the user 120 taken by the camera 110. The mobile device 105 modifies the font characteristics, such as font size, font type, font style, font placement, font color, etc. while analyzing the facial features of the user 120. In some embodiments, the mobile device 105 modifies other content characteristics, such as background colors, background images, window sizes, aspect ratios, refresh rates, sound levels, accessibility settings, etc. In one example, the mobile device 105 presents the text 112 at a certain size and then analyzes the images of the user 120. If the user 120 does not move the mobile device 105 closer to the user's face, then the mobile device 105 determines that the font is large enough for the user to see comfortably. The mobile device 105 also detects facial expressions, patterns, size of features, etc., to detect a user's activity. For instance, if the user 120 squints to see the text 112, the mobile device 105 will detect the squinting via analysis of the images of the user 120 and adjust font size of the text 112 to be larger. The mobile device 105 also stores data within a data store internal to the mobile device 105 and/or in a network account accessible via a communications network (e.g., in an account accessible via the Internet). The mobile device 105 stores within the data store information about the lighting source 114, the distance 145 from the user 120, the user's facial expressions, the user's current activity, information about the content presented via the mobile device, etc. Some characteristics of the external environment may include light and sound levels within the environment around the mobile device, a state of the environment around the user, activity that occurs within the surrounding environment, etc. Some characteristics of the content may include, for example, a type of application through which the content is presented, a color of a background against which content is presented, a presentation type or content type (e.g., 2D versus 3D content presentation, video content versus static image content, themed game content versus business content, etc.). The mobile device 105 can also detect a change in distance and/or orientation of the mobile device 105 relative to the user 120 and, based on the change in distance and/or orientation of the mobile device 105 relative to the user 120, adjust characteristics of the content, such as the size, type, placement, etc. of the text 112 (e.g., to be larger or smaller, skewed, bold, different color, centered, scrolling, double spaced, etc.).

FIG. 1B, at a time different from a time associated with FIG. 1A, the mobile device 105 detects a change to certain characteristics of the user 120, the environment, and/or the content presented via the mobile device 105. For example, even though the mobile device 105 may be the same distance 145 from the user 120, the mobile device 105 detects, via digital analysis of new images of the user 120 and/or the environment taken by the camera 110, that the user 120 is squinting. For instance, via analysis of the images of the user 120, the mobile device 105 detects that the eyes 130 of the user 120 are slightly closed, the user's brow 131 is furrowed, etc. Further, the mobile device 105 detects that a new light source 113 produces more light, which may result in more glare on the display of the mobile device 105. Further, the mobile device 105 detects that the user 120 has an earpiece 135, which indicates an activity performed by the user 120 that may distract the user from reading smaller text (e.g., digital analysis detects the presence of the earpiece 135). The earpiece 135 is a visual clue related to the user's current location and/or activity, such as that the user 120 is within a vehicle and/or suggesting that the user 120 is driving, walking, or performing some other hands-free task that could indicate a need for other font characteristics than for conditions associated with FIG. 1A. Further, the mobile device 105, in FIG. 1B, detects that the user is not wearing glasses 132 as in FIG. 1A. Thus, based on the analysis of the change to user characteristics, the mobile device 105 changes the font characteristics to text 114 presented at the second time associated with FIG. 1B (e.g., changes the font to a larger size, double spaces the font, etc.). In some embodiments, the mobile device 105 also enhances the presentation of the content, such as by adding sounds (e.g., by automatically determining to read text from the mobile device 105 out loud because of the conditions of FIG. 1B, as shown in FIG. 1B where the mobile device 105 reads the content). In other examples, the mobile device 105 moves the position of the content or changes its state, such as by transferring presentation of the content to a nearby display (e.g., a peripheral display connected to, or interfaced with, the mobile device 105), by turning off content, by scrolling content automatically, by zooming in on content, etc. In some embodiments, the mobile device 105 also switches modes based on conditions, such as by switching to a hand-free voice activation mode.

Figure 2:
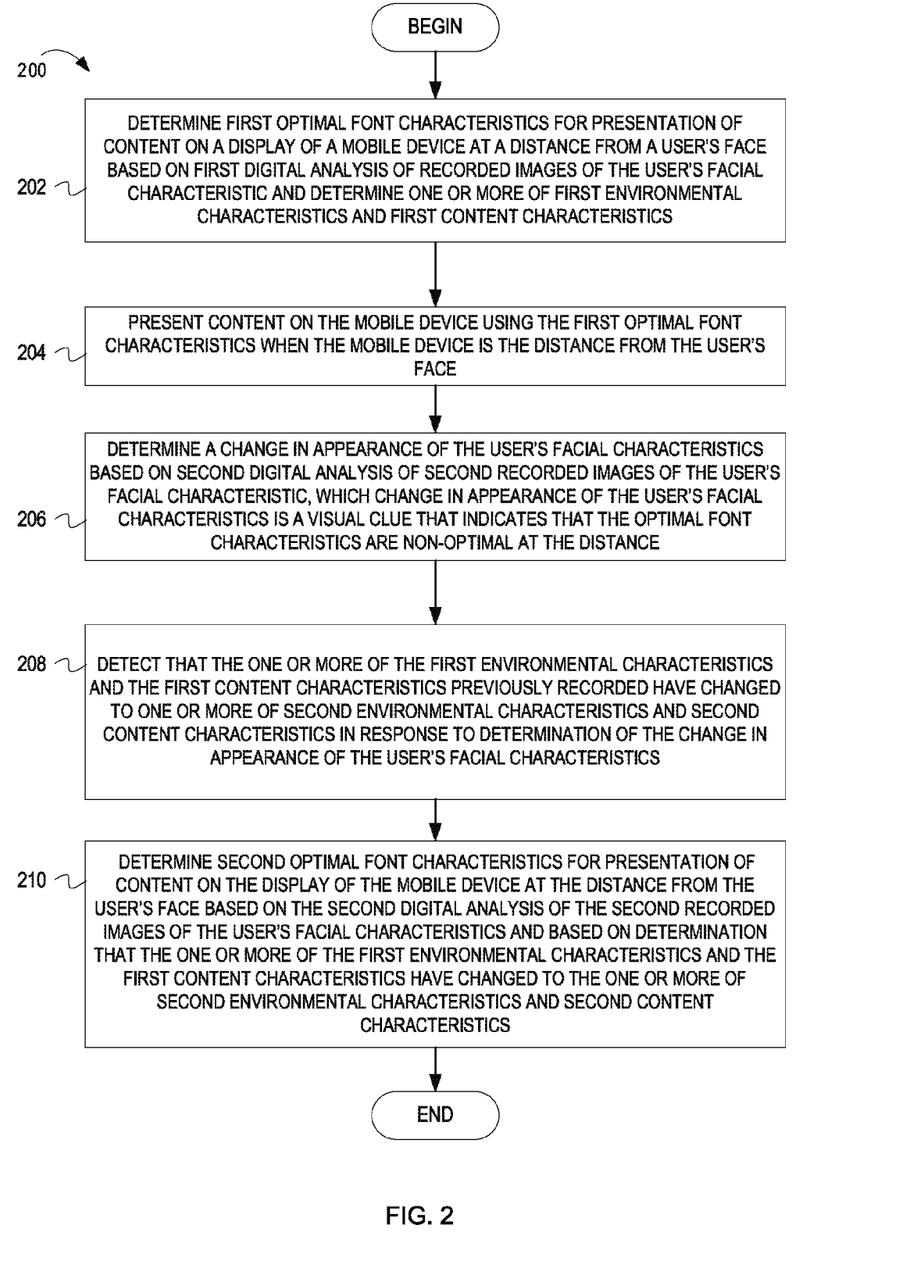
FIG. 2 is a flowchart depicting example operations for dynamically modifying font characteristics based on analysis of user characteristics given specific environmental characteristics or content characteristics.

FIG. 2 is a flowchart depicting example operations for dynamically modifying font characteristics based on analysis of user characteristics given specific environmental characteristics or content characteristics. For example purposes, operations associated with the blocks in FIG. 2 will be described as being performed by a dynamic-content modification system ("system"), which may, for example, include any or all of the elements described in FIG. 1, 3, 4, 5 or elsewhere. FIG. 2 illustrates a flow that the system can perform.

Figure 3:
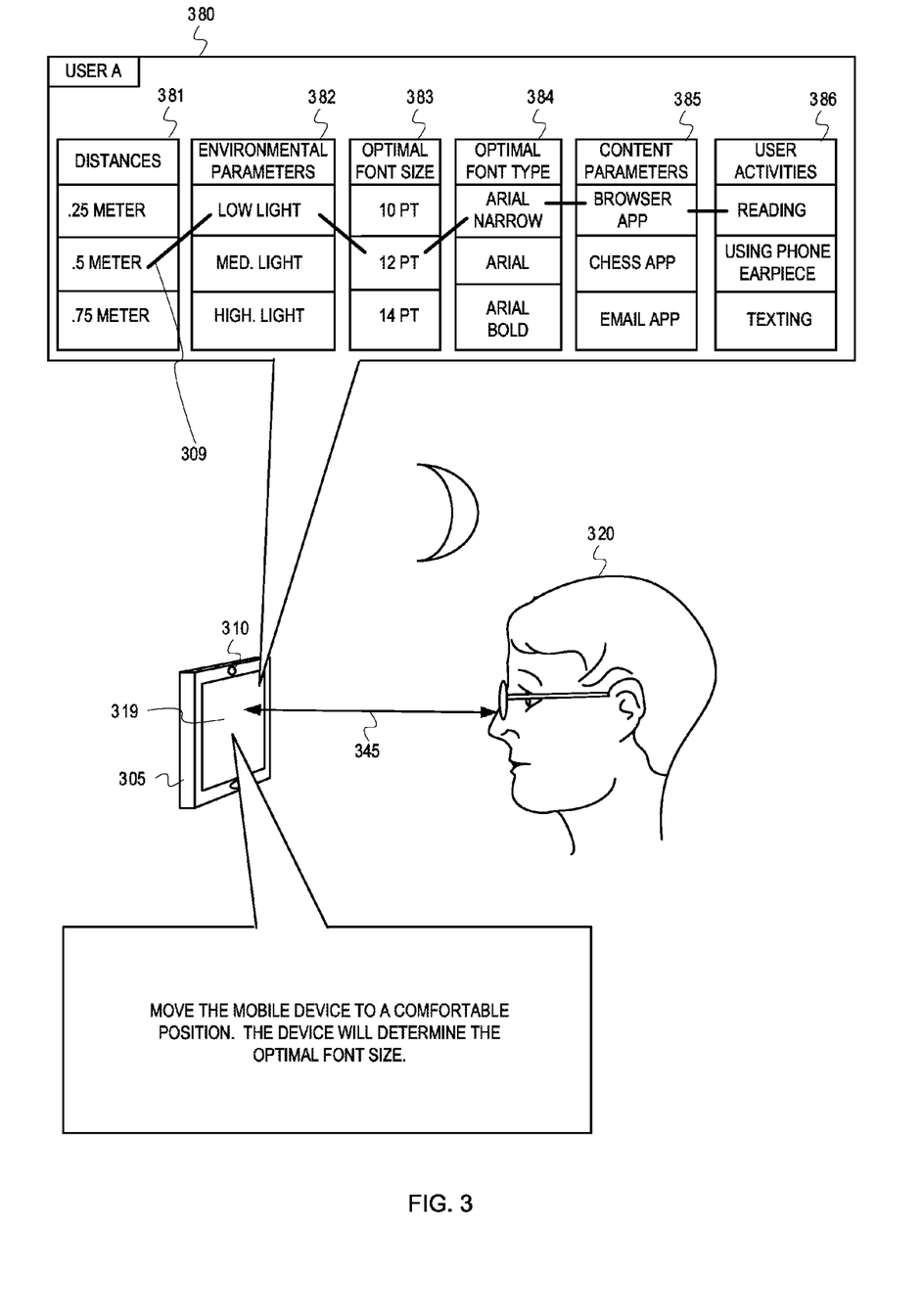
FIGS. 3-4 are example conceptual diagrams of dynamically storing and adapting optimal font characteristics based on analysis of user characteristics given specific environmental characteristics or content characteristics content.
Figure 4:
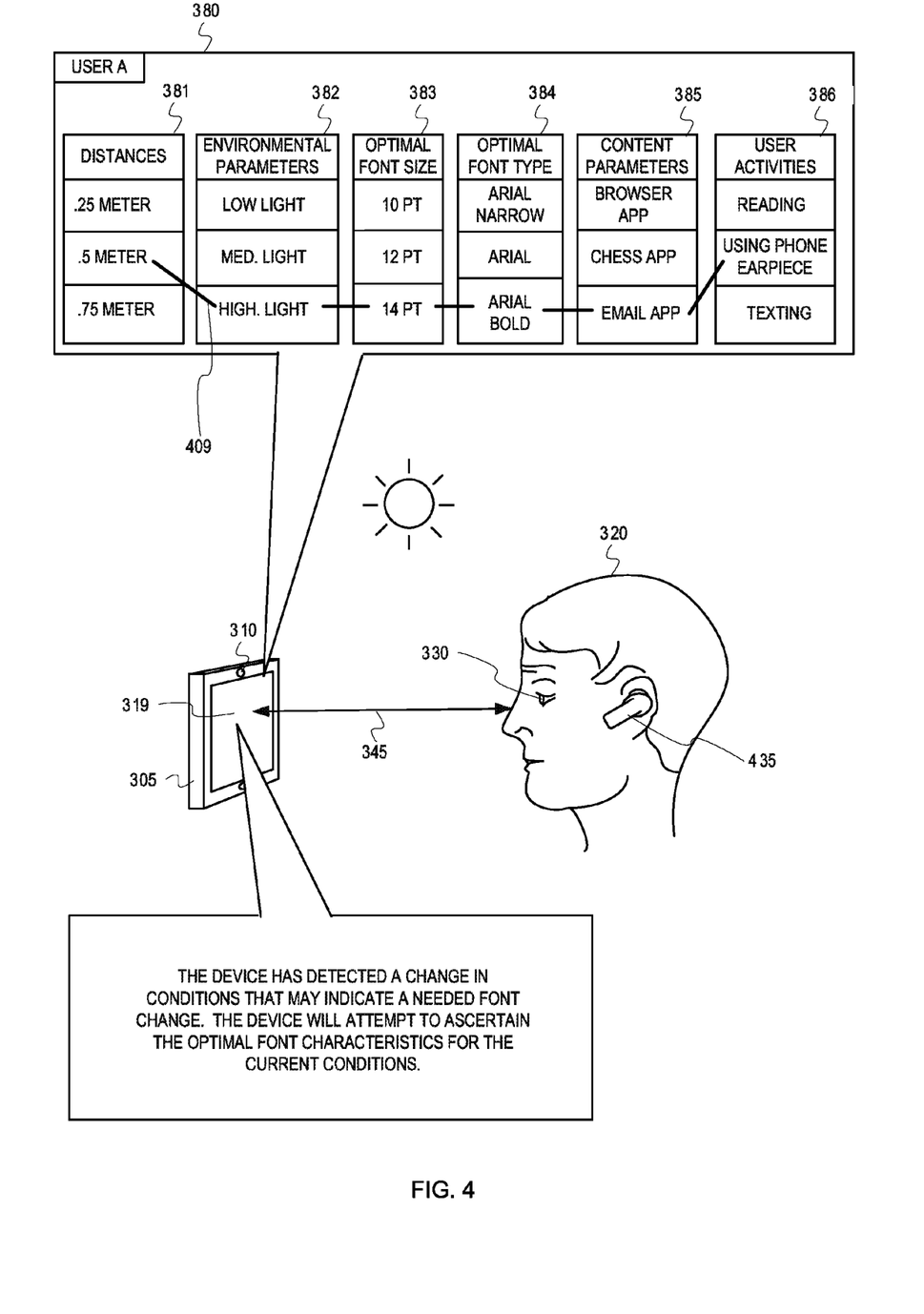

Referring to FIG. 2, the system determines first optimal font characteristics for presentation of content on a display of a mobile device at a distance from a user's face based on first digital analysis of recorded images of the user's facial characteristic and determines one or more of first environmental characteristics and first content characteristics (202). In some embodiments, the system performs a calibration to determine optimal font characteristics (e.g., font sizes, font styles, etc.) given the user characteristics (e.g., given certain distances from the user, given user identity, given user expressions, etc.). As part of the calibration, the system stores the optimal font characteristics in a data store associated with the user. FIGS. 3-4 are example conceptual diagrams of dynamically storing and adapting optimal font characteristics based on analysis of user characteristics given specific environmental characteristics or content characteristics. In FIG. 3, a mobile device 305, similar to the mobile device 105 described in FIG. 1, is part of the dynamic-content modification system. The mobile device 305 requests that a user 320 move the mobile device 305 to a comfortable position, which, in this example, is a distance 345 from the face of the user 320 (e.g., 0.5 meter).

The mobile device 305 can prompt the user 320 to calibrate the device at different distances, given different environmental and/or content conditions. The mobile device 305 determines optimal content presentation characteristics, such as optimal font characteristics, optimal backlighting levels, optimal modes, optimal power settings, optimal sound settings, optimal video play-back settings, optimal application settings, and so forth. For instance, in FIG. 3, the mobile device 305 determines optimal font characteristics based on analysis of the user characteristics and the environmental and/or content conditions. In one example, the mobile device 305 detects facial characteristics of the user 320 whose face is at the distance 345. The mobile device 305 records images of the user characteristics via a camera 310. The mobile device 305 analyzes the facial characteristics of the user 320, as detected from the images, given the conditions of the environment and/or the content at the time of calibration (e.g., given a degree of light, shadows, etc. cast upon the user 320 as digitally detected from the images). The system analyzes (e.g., via a facial recognition algorithm) and interprets the appearance of the facial characteristics that are captured via the camera 310 of the mobile device 305. In some embodiments, the mobile device 305 captures images of a size of facial features and analyzes the images to determine a change in size of the user's facial features. In another embodiment, the system detects movement, patterns, shapes, etc. of certain facial features to determine optimal content characteristics. For example, the mobile device 305 can detect when a user is squinting his or her eyes 330. In some embodiments, the mobile device 305 can detect a degree of squint, and a change in the degree of squinting during calibration. For example, the mobile device 305 can increase font size, presented via display 319, to a first level and detect a degree of a user's squinting. If the squinting appears to be less than before, but still indicates squinting, the system may further increase font size and then reassess a degree of the user's squinting. Based on detection of the change in the user's degree of squinting, the system can determine a degree of perceived user preference for a font size (e.g., squinting implies more preference for a larger font size). Based on the perceived user preference, the mobile device 305 can detect an optimal size for the font given a user's preference. The mobile device 305 then stores the optimal size and uses the optimal size as a baseline for comparison and as a default setting for font presentation at the given distance.

In another example, the mobile device 305 determines optimal content characteristics (e.g., an optimal size for font) based on an amount of time the user 320 is focused on a specific area of interest on the display 319 (e.g., the mobile device 305 detects an amount of time that the user's eyes remain fixed on a specific line of text on the display 319).

The mobile device 305 stores the data regarding the conditions (i.e., user, environmental and/or content conditions) in a data store 380 which is associated with the user 320. For instance, the mobile device 305 stores within the data store 380 optimal font characteristics (383 and 384) for given condition sets, distances 381 from the user 320 at which calibrations were performed, content characteristics 385 performed at times of calibration or that may occur on the mobile device 305, environmental characteristics at times of calibration or that which may occur at other times lighting conditions 382 at times of calibration or that may occur at other times, ambient sound levels, etc.), user activities 386 that occurred at times of calibration or that may occur at other times, and so forth. Further, the system relates the data stored in the data store 380, such as via data relationships 309. The data relationships 309 can be stored in various ways, such as via data strings, via entries in relational data tables of a relational database, within data profiles, within configuration files, and so forth. The mobile device 305 can store data from different users of the mobile device 305 in different user profiles and/or different database tables. In some embodiments, the mobile device 305 is connected to a server on which multiple data stores of different users are stored, which also contain calibrated settings for optimal content presentation given certain conditions. The mobile device 305 can send data, via a communications network, to the server regarding user characteristics, environmental characteristics, content characteristics, and so forth. The server can analyze the data received from the mobile device 305 and/or cross reference against other users' calibrated settings. The server can send back to the mobile device 305 suggestions for optimal content characteristics based on the analysis and/or cross referencing performed by the server.

Returning momentarily to FIG. 2, the flow 200 continues where the system presents content on the mobile device using the first optimal font characteristics when the mobile device is the distance from the user's face (204). For, example, as in FIG. 4, at some point after a calibration of the mobile device 305, the mobile device 305 is positioned the distance 345 from the user's face. Given that the mobile device 305 is at the distance 345, the mobile device 305 reads from the data store 380 the first optimal font characteristics (e.g., the 12-point, Arial Narrow font properties). In some embodiments, the mobile device 305 detects an identity for the user 320 based on facial recognition algorithms and accesses the data store 380 that is associated with the user 320. The mobile device 305 can initially present content via the display 319 using the first optimal font characteristics. In some embodiments, after detecting the distance 345 after the initial calibration, and after reading the first optimal font characteristics from the data store 380, the mobile device 305 can detect changes to the distance 345. Based on the changes, the mobile device 305 proportionately changes the optimal font characteristics to the distance changes the mobile device 305 changes font size to increase when the distance 345 decreases, or vice versa).

Returning again to FIG. 2, the flow 200 continues where the system determines a change in appearance of the user's facial characteristics based on second digital analysis of second recorded images of the user's facial characteristic at the second time, which change in appearance of the user's facial characteristics is a visual clue that indicates that the optimal font characteristics are non-optimal at the distance (206). The system can detect any type of event that may indicate that the optimal font characteristics are non-optimal. Detecting a change to the user's facial characteristics is just one type of event that is a visual clue. Other types of events may be related to other individuals in the vicinity of the user, an environmental settings or location, a change in content type, a communication received from the mobile device, a payment to view or access certain content, etc. The system can further detect more than one event, or combinations of events, in specific sequences, based on priority, or based on any other relationship between the events. For example, the system can detect that the one or more of the first environmental characteristics and the first content characteristics previously recorded have changed to one or more of second environmental characteristics and second content characteristics in response to determination of the change in appearance of the user's facial characteristics (208). Further, the system determines second optimal font characteristics for presentation of content on the display of the mobile device at the distance from the user's face based on the second digital analysis of the second recorded images of the user's facial characteristics and based on determination that the one or more of the first environmental characteristics and the first content characteristics have changed to the one or more of second environmental characteristics and second content characteristics (210). For example, in FIG. 4, the mobile device 305 detects that the mobile device 305 is at the distance 345 and presents content via the mobile device 305 using optimal characteristics that were detected for the first distance 345. The mobile device 305 takes second images of the user's facial characteristics (e.g., via the camera. 310) and analyzes the second images to determine whether user characteristics, such as facial characteristics of the user 320, have changed in response to presentation of the content on the mobile device 305. For instance, the mobile device 305 detects a change in the user's facial expressions, such as a squinting action by the user 320, which change indicates that the first optimal font characteristics are non-optimal at the distance 345. The mobile device 305 may detect other changes to facial characteristics compared to previously recorded images, such as detection of changes in lighting on the user's face, detection that the user 320 is not wearing glasses, and detection that the user 320 is wearing a wireless earpiece 435. The mobile device 305 determines that something about the user's characteristics indicate that the previously determined optimal content characteristics are no longer optimal.

In response to detecting the change in the user characteristics, the mobile device 305 detects a change in the one or more of the environmental characteristics and the content characteristics. For example, based on the detected change to the user's characteristics, the mobile device 305 accesses the data store 380 and determines data and/or one or more previous relationships stored in the data store 380 regarding the user characteristics, the environmental characteristics and/or content characteristics that were detected at the time of the calibration. The mobile device 305 compares new data, obtained via analysis of the second images, to the data in the data store 380 and determines that the first environmental and/or content characteristics have changed to new, or different environmental and/or content characteristics (e.g., the mobile device 305 detects changes to lighting levels of the environment via digital analysis of the user's features within the second images, detects changes to location of where the user is at based on digital analysis of the second images, detects movement of the background based on digital analysis of the second images, detects ambient sounds based on audio recordings of the environment, etc.). The mobile device 305, therefore, can determine second optimal content characteristics (e.g., second optimal font characteristics) for the distance 345 based on the change to the user characteristics and the change to the one or more of the environmental characteristics and the content characteristics. The mobile device 305 stores additional data in the data store 380 regarding the changes to the user characteristics, the changes to the environmental characteristics, and/or the changes to the content characteristics. The mobile device 305 can further generate new relationship 409 that tie together the new data for future reference and as a default setting for content presentation at the distance 345 given the changed characteristics.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct an electronic device (e.g., computer, cell phone, television, set-top box, programmable data processing apparatus, etc.) to function in a particular manner, such that the instructions stored in the computer readable medium produce an article of manufacture including instructions which implement the function/act specified in the flowchart and/or block diagram block or blocks.

The computer program instructions my also be loaded onto an electronic device to cause a series of operational steps to be performed on the electronic device to produce a computer implemented process such that the instructions, which execute on the electronic device, provide processes for implementing the functions/acts specified in the flowchart and/or block diagram block or blocks.

Figure 5:
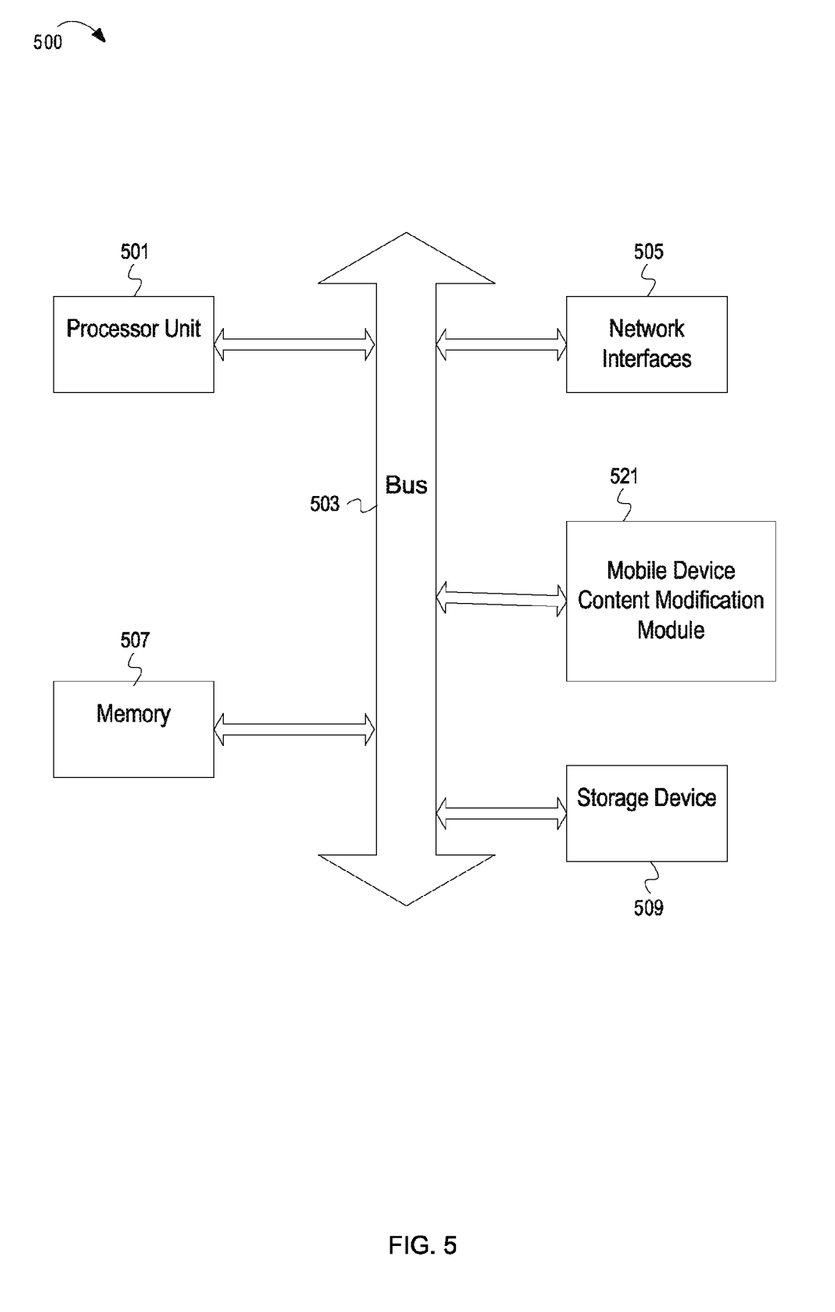
FIG. 5 depicts an example computer system.

FIG. 5 depicts an example computer system 500. The computer system 500 includes a processor unit 501 (possibly including multiple processors, multiple cores, multiple nodes, and/or implementing multi-threading, etc.). The computer system 500 includes memory 507. The memory 507 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable storage media or computer readable storage media. The computer system 500 also includes a bus 503 (e.g., PCI bus, ISA, PCI-Express bus, HyperTransport® bus, InfiniBand® bus, NuBus bus, etc.), a network interface 505 (e.g., an ATM interface, an Ethernet interface, a Frame Relay interface, SONET interface, wireless interface, etc.), and a storage device(s) 509 (e.g., optical storage, magnetic storage, etc.). The computer system 500 also includes a mobile device content modification module 521. The mobile device content modification module 521 can dynamically adjust mobile-device content, such as font characteristics, based on analysis of user characteristics according to environmental characteristics, content characteristics, and so forth. Any one of these functionalities may be partially (or entirety) implemented in hardware and/or on the processing unit 501. For example, the functionality may be implemented with an application specific integrated circuit, in logic implemented in the processing unit 501, in a co-processor on a peripheral device or card, etc. Further, realizations may include fewer or additional components not illustrated in FIG. 5 (e.g., video cards, audio cards, additional network interfaces, peripheral devices, etc.). The processor unit 501, the storage device(s) 509, and the network interface 505 are coupled to the bus 503. Although illustrated as being coupled to the bus 503, the memory 507 may be coupled to the processor unit 501. In some embodiments, the computer system 500 is a mobile device, such as a smartphone, a tablet, a laptop, etc. In some embodiments, the computer system 500 is connected to, or interfaced with, a mobile device. In some embodiments, the computer system 500 is configured to communicate with a mobile device via a communications network, such as via the Internet, via a telephone network, via a wireless network, etc.

While the embodiments are described with reference to various implementations and exploitations, it will be understood that these embodiments are illustrative and that the scope of the inventive subject matter is not limited to them. In general, techniques for dynamically modifying mobile-device content as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the example configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
    determining a first size for presentation of content on a display of a mobile device at a distance from a user;
    determining that the mobile device is the distance from the user;
    presenting content on the mobile device using the first size;
    analyzing an appearance of a user and a background depicted in one or more images obtained via the mobile device;
    after presentation of the content, based on analysis of the appearance of the user and the background, detecting a visible condition of the environment that distracts the user, wherein the user responds to the visible condition with a degree of change in movement of a facial feature of the user, wherein the degree of change in the movement of the facial feature corresponds to a degree of preference for a size of the content;
    accessing a data store associated with the mobile device, wherein the data store indicates a description of the degree of change of the movement of the facial feature;
    detecting a value in the data store associated with the visible condition of the environment depicted in the one or more images, wherein the value associated with the visible condition of the environment is associated with the degree of change of the movement of the facial feature;
    selecting from the data store one or more settings for presentation of the content via the mobile device, wherein the one or more settings are associated with one or more of the value and the description of the degree of change of the movement of the facial feature in the data store;
    incrementing the size of the content on the display of the mobile device, proportional to the degree of change in the movement of the facial feature according to the one or more settings; and
    presenting the content via the display of the mobile device in accordance with the one or more second sizes.

2. The method of claim 1, wherein the detecting the degree of change in the movement of the one or more facial features of the user comprises detecting varying degrees of change in one or more of squinting the eyes, furrowing the brow, and frowning.

3. The method of claim 1, further comprising detecting a change to the visible condition of the environment around the user, wherein the visible condition of the environment indicates an activity that occurs within the environment that distracts the user from viewing the content.

4. The method of claim 1, wherein the determining the first size for presentation of the content is based on first digital analysis of first recorded images taken via the mobile device and wherein the detecting the degrees of change in the movement of the one or more facial features of the user is based on second digital analysis of second recorded images taken via the mobile device after the presentation of the content via the display at the distance from the user.

5. The method of claim 4 further comprising:
selecting the first size based on the first digital analysis;
storing a first setting in the data store associated with the user, wherein the first setting is associated with the first size;
detecting an identity of the user via facial recognition of the user via the second digital analysis;
generating second settings associated with the second sizes based on the second digital analysis of the second recorded images at least partially in response to the detecting the identity of the user and based on the degrees of change in the movement of the one or more facial features of the user; and
storing the second settings in the data store associated with the user.

6. The method of claim 1 further comprising:
detecting that one or more eyes of the user are squinting when the content is presented at the first size, wherein the content comprises text with a first font size equivalent to the first size; and
incrementing the first font size to second font sizes in incrementing levels, wherein the presenting the content via the display of the mobile device in accordance with the one or more second sizes comprises using the second font sizes in the incrementing levels until detecting that the one or more eyes or the user are no longer squinting.

7. One or more computer-readable storage devices configured to store instructions, which when executed by one or more processors perform operations comprising:
determining a first font size for presentation of content on a display of a mobile device at a distance from a user, wherein the first font size is based on first digital analysis of one or more recorded images of one or more facial characteristics of the user;
determining that the mobile device is the distance from the user;
presenting content on the mobile device using a font having the first font size;
analyzing an appearance of a user and a background depicted in one or more second recorded images obtained via the mobile device after the content is presented, wherein one or more activities occur in the background that distract the user;
after presenting the content, based on analysis of the appearance of the user when the user is distracted by the one or more activities that occur in the background, detecting degrees of change in movement of the one or more facial characteristics of the user, wherein the degrees of change in the movement of the one or more facial characteristics correspond to degrees of preference for a size of the content;
accessing a data store associated with the mobile device, wherein the data store indicates descriptions of the degrees of change in the movement of the one or more facial characteristics;
detecting a value in the data store associated with a visible condition of an environment depicted in the one or more second recorded images, wherein the value associated with the visible condition of the environment is associated with the degree of change of the movement of the facial feature;
selecting from the data store one or more settings for presentation of the content via the mobile device, wherein the one or more settings are associated with one or more of the value and the descriptions of the degrees of change in the movement of the one or more facial characteristics in the data store;
determining second font sizes for presentation of the font on the display of the mobile device at the distance from the user according to the one or more settings, wherein the second font sizes are proportional to the degrees of change in the movement of the one or more facial characteristics of the user; and
modifying presentation of the content in accordance with the second font sizes.

8. The one or more computer-readable storage devices of claim 7, wherein the determining the first font size for presentation of the content is based on first analysis of one or more of one or more first environmental characteristics and one or more first content characteristics associated with the mobile device and further comprising detecting that the one or more of the one or more first environmental characteristics and the one or more first content characteristics have changed to one or more of one or more second environmental characteristics and one or more second content characteristics in response to detecting the degrees of change in the appearance of the one or more facial characteristics of the user.

9. The one or more computer-readable storage devices of claim 7, said operations further comprising:
presenting an automated audible presentation of content in response to the detecting the degrees of change in the movement of the one or more facial characteristics of the user.

10. The one or more computer-readable storage devices of claim 7, said operations further comprising, in response to the detecting the degrees of change in the movement of the one or more facial characteristics of the user, one or more of moving a position of the content on a display associated with the mobile device, transferring presentation of the content to a peripheral display, scrolling the content automatically, zooming the content, and switching to a hands-free voice activation mode.

11. The one or more computer-readable storage devices of claim 7, said operations further comprising:
detecting that one or more eyes of the user are squinting when the content is presented with the first font size;
after detecting that the one or more of the eyes of the user are squinting, incrementing the size of the font from the first font size to the second font sizes according to incrementing levels greater than the first font size,
after each instance that the size of the font is incremented to one of the second font sizes that corresponds to one of the incrementing levels, detecting whether the one or more eyes of the user are still squinting, wherein the incrementing of the size of the font terminates when the one or more eyes or the user are no longer squinting.

12. A computer-implemented method comprising:
presenting content via a mobile device;
analyzing an appearance of a user and a background depicted in one or more images obtained via the mobile device;
based on analysis of the appearance of the user and the background, detecting a visible condition of an environment depicted in the one or more images, wherein the visible condition has an appearance of movement;
accessing a data store associated with the mobile device, wherein the data store indicates a description of an activity that, if performed, would distract the user from presentation of the content via the mobile device;
detecting a value in the data store associated with the visible condition of the environment depicted in the background, wherein the value associated with the visible condition of the environment is associated with the description of the activity;

selecting from the data store one or more settings for presentation of the content via the mobile device, wherein the one or more settings are associated with one or more of the value and the description of the activity in the data store; and changing the presentation of the content according to the one or more settings.

13. The computer-implemented method of claim 12, wherein prior to the analyzing the appearance of the user and the background, the content is presented in a visual format from a visual output mechanism of the mobile device, and wherein the changing the presentation of the content is configured to one or more of change the presentation of the content in the visual format to an audio format presented via an audio output mechanism associated with the mobile device and change the mobile device to a voice activation mode.

14. The computer-implemented method of claim 12, wherein the detecting the visible condition of the environment depicted in the background that has the appearance of movement comprises detecting one or more of movement of the user relative to the background, movement of one or more objects depicted in the background, and movement of one or more individuals in the background other than the user.

15. The computer-implemented method of claim 12, further comprising one or more of determining that the user is talking on the mobile device, determining that the user is texting on the mobile device, determining that the user is walking, determining that the user is driving, and determining that the user is performing a hands-free task.

16. The computer-implemented method of claim 12, further comprising detecting a degree of change in appearance of one or more facial features of the user, wherein the one or more settings are configured to set a degree of size of the content proportional to the degree of change in the appearance of the facial feature.

17. The computer-implemented method of claim 12, wherein the detecting the visible condition of the environment depicted in the background that has the appearance of the movement in the background comprises one or more of detecting activity that occurs to one or more individuals in an environment around the user, detecting movement of one or more individuals in an environment behind the user, and detecting that the user is inside a vehicle.

* * * * *